United States Patent
Kölbl et al.

(10) Patent No.: US 12,492,993 B2
(45) Date of Patent: Dec. 9, 2025

(54) OPTICAL DEVICE HAVING A TRIGGER UNIT, TRIGGER UNIT, AND METHOD FOR CAPTURING INFRARED ABSORPTION SPECTRA

(71) Applicant: DEUTSCHES ZENTRUM FÜR LUFT—UND RAUMFAHRT E.V., Bonn (DE)

(72) Inventors: Christoph Kölbl, Hardthausen (DE); Lisa Dreier, Hardthausen (DE)

(73) Assignee: DEUTSCHES ZENTRUM FÜR LUFT—UND RAUMFAHRT E.V., Bonn (DE)

( * ) Notice: Subject to any disclaimer, the term of this patent is extended or adjusted under 35 U.S.C. 154(b) by 146 days.

(21) Appl. No.: 18/553,744

(22) PCT Filed: Apr. 1, 2022

(86) PCT No.: PCT/EP2022/058784
§ 371 (c)(1),
(2) Date: Oct. 3, 2023

(87) PCT Pub. No.: WO2022/214404
PCT Pub. Date: Oct. 13, 2022

(65) Prior Publication Data
US 2024/0192132 A1 Jun. 13, 2024

(30) Foreign Application Priority Data
Apr. 6, 2021 (DE) ...................... 10 2021 108 533.0

(51) Int. Cl.
*G01N 21/39* (2006.01)
(52) U.S. Cl.
CPC ....... *G01N 21/39* (2013.01); *G01N 2021/396* (2013.01); *G01N 2201/06113* (2013.01); *G01N 2201/12* (2013.01)

(58) Field of Classification Search
CPC ............ G01N 21/39; G01N 2021/396; G01N 2201/06113; G01N 2201/12; G01N 21/35;
(Continued)

(56) References Cited

U.S. PATENT DOCUMENTS 5,047,639 A 9/1991 Wong
9,476,770 B1 10/2016 Green et al.

FOREIGN PATENT DOCUMENTS

DE 102016015424 A1 6/2018
EP 3332230 6/2018

OTHER PUBLICATIONS

International Search Report (Aug. 8, 2022) for corresponding International App. PCT/EP2022/058784.
(Continued)

*Primary Examiner* — Md M Rahman
(74) *Attorney, Agent, or Firm* — Panitch Schwarze Belisario & Nadel LLP

(57) ABSTRACT

An optical device includes a tunable laser for repeatedly irradiating a sample with laser light as wavelength scans over a defined wavelength range, a trigger unit and a data acquisition unit. The laser outputs at least a first trigger signal and a second trigger signal. The first trigger signal outputs a temporal start and a temporal end of a wavelength scan, and the second trigger signal comprises a pattern of scanning pulses distributed over the tunable wavelength range at predefined wavelength intervals. The trigger unit has an adder which adds the trigger signals and a mixer which mixes the trigger signals with the reference signal to form the trigger output signal. A method for capturing infrared absorption spectra is also provided.

20 Claims, 16 Drawing Sheets

(58) Field of Classification Search
CPC .... G01N 2021/399; G01J 3/0286; G01J 3/10; G01J 3/433
USPC ............................................. 356/402
See application file for complete search history.

(56) References Cited

OTHER PUBLICATIONS

Wei Min et al. "Calibration-free wavelength modulation spectroscopy for gas concentration 1-20 measurements using a quantum cascade laser" Applied Physics B, Springer Berlin Heidelberg, Berlin/Heidelberg, vol. 123, No. 5, Apr. 19, 2017 (Apr. 19, 2017), pp. 1-10, [retrieved on Apr. 19, 2017] DOI: 10.1007/S00340-017-6678-Y ISSN: 0946-2171, XP036246830.
German Official Action (Apr. 10, 2021) for corresponding German App. 10 2021 108 533.0.

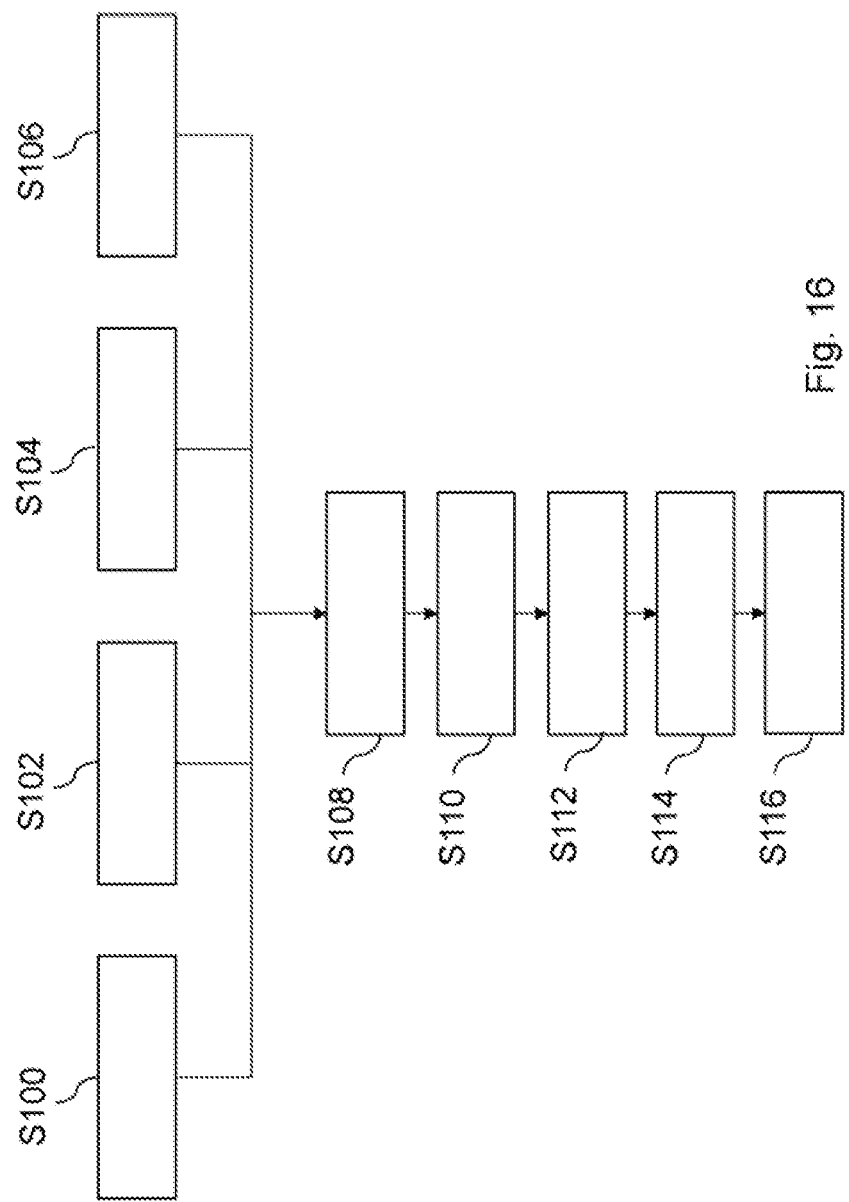

OPTICAL DEVICE HAVING A TRIGGER UNIT, TRIGGER UNIT, AND METHOD FOR CAPTURING INFRARED ABSORPTION SPECTRA

BACKGROUND AND SUMMARY

The invention relates to an optical device having a trigger unit for capturing infrared absorption spectra of a sample, and a trigger unit for processing at least a first trigger signal, a second trigger signal and a reference signal of a tunable laser of an optical device for capturing infrared absorption spectra and a method for capturing infrared absorption spectra with an optical device.

Infrared spectroscopic measurements are increasingly performed with tunable quantum cascade lasers (QCL) instead of Fourier transform infrared (FTIR) spectrometers, since a higher signal-to-noise ratio can be achieved with QCLs. The MIR laser source in particular has so far limited the possible applications, because a compromise had to be made between beam quality and wavelength accuracy, especially at high tuning rates. In contrast, new IR laser sources in the mid-infrared (MIR) range enable a high tuning rate of over 1000 $cm^{-1}$/s and at the same time a high beam quality and spectral reproducibility. The linking of several so-called external cavity quantum cascade lasers allows an ultra-wide spectral tuning range for both pulsed and CW systems.

This new generation of lasers enables MIR absorption measurements with chemical selectivity and high sensitivity, which can be used, for example, in remote detection for spectroscopy on samples with low concentrations and/or over greater distances. The system usually consists of the tunable MIR laser source, optics and one or more signal detectors.

While the emitted wavelength of the laser is tuned over a specific wavelength range, the measurement signal of this so-called wavelength scan is captured with signal detectors and the electrical signal of the signal detectors is detected with an analog-to-digital converter (ADC). In order to obtain corresponding statistics, many of these wavelength scans are usually captured one after the other and the measurement data are averaged.

During the scanning process of the laser and during data acquisition, in which in a first step an electric voltage is captured as a function of time, the signal detector or the ADC only captures the measurement signal with a time stamp. In a subsequent, second step, the corresponding wavelengths are associated with the measurement signal, which is referred to as wavelength calibration.

Depending on the type of QCL laser system, two main methods have been used for wavelength calibration: calibration using a Fabry-Perot etalon or a reference measurement using a polymer film or gas cell.

U.S. Pat. No. 5,047,639A describes an optical device in which the laser wavelength is stabilized to the absorption band, with accuracies of up to 0.001 nm being achieved in this case. A feedback loop outputs a LOW signal until the laser wavelength matches the wavelength of the absorption peak and then transitions to HIGH.

It is desirable to create an optical device for capturing infrared absorption spectra of a sample, which enables efficient calibration of the measurement data.

It is also desirable to create a trigger unit of an optical device for capturing infrared absorption spectra, which enables efficient calibration of the measurement data.

It is also desirable to create a method for capturing infrared absorption spectra with an optical device, which enables efficient calibration of the measurement data.

According to one aspect of the invention, an optical device for capturing infrared absorption spectra of a sample is proposed, comprising at least one tunable laser which is designed for repeatedly irradiating the sample with laser light as a wavelength scan over a defined wavelength range, at least one reference detector in a reference beam path, in which part of the emitted laser light is received and converted into a reference signal, at least one signal detector that receives laser light scattered on the sample and converts it into a measurement signal, at least one trigger unit with at least one input for trigger signals, at least one input for the reference signal and at least one output for a trigger output signal, and a data acquisition unit that is designed to detect a trigger output signal and the measurement signal.

The laser is designed to output at least a first trigger signal and a second trigger signal, wherein the first trigger signal outputs a temporal start and a temporal end of a wavelength scan and the second trigger signal comprises a pattern of scanning pulses distributed over the tunable wavelength range at predetermined, in particular equal, wavelength intervals. The trigger unit also has an adder, which is designed to add the trigger signals, and a mixer, which is designed to mix the trigger signals with the reference signal to form the trigger output signal.

The trigger unit has at least one input for at least one first trigger signal and at least one input for at least one second trigger signal. The output emits a combined trigger output signal.

An efficient type of wavelength calibration by means of a trigger unit is advantageously used with the proposed optical device. A wavelength calibration and power calibration is possible with only one single reference detector and a single ADC channel, so that only two data acquisition channels are required for the measurement. In this case, a so-called digital scan trigger is used as the first trigger signal, or a so-called wavelength trigger is used as the second trigger signal, which are provided by the laser during the scanning process.

The trigger output signal is advantageously acquired unidirectionally by the data acquisition unit. A continuous measurement is carried out, namely the trigger signals for scan and wavelength triggers are output continuously and are only stopped when the measurement is ended.

Advantageously, the wavelength of the laser can be tuned over a wide spectral range, for example in the MIR range over a spectral range that is several micrometers wide, for example from 6 to 11 μm.

The scan trigger as the first trigger signal is synchronized with the emitted wavelength scan in such a way that the scan trigger outputs a temporal start and end of a wavelength scan. The scan trigger indicates that the laser is actively scanning and emitting laser light at the same time. Active scanning means that the wavelength of the laser is changed from a start value to an end value, in particular is changed continuously or in steps. The scan trigger thus indicates whether a laser module is currently active.

For example, when starting up the laser or when changing a laser module, the scan trigger has an electrical LOW signal, while the scan trigger has an electrical HIGH signal when passing through a laser module.

A LOW signal corresponds to 0 V, for example, and a HIGH signal to 2 V, for example. This means that the signals from the individual laser modules can later be separated from one another.

The wavelength trigger as the second trigger signal has a pattern of scanning pulses distributed over the defined wavelength range of the wavelength scan at predetermined, in particular equal, wavelength intervals, so that the wavelength corresponding to each scanning pulse is known in principle. The wavelength trigger outputs an electrical LOW level or a HIGH level, so that the wavelength can be deduced from the measurement setting by counting the wavelength trigger pulses. Depending on the setting, individual digital pulses can be output within a specific wavelength range and wavelength interval. For example, when scanning in the wavelength range of 7.9-11.1 μm, in the range of 8.0-11.0 μm, scanning pulses are output at intervals of 0.5 μm as wavelength triggers as soon as the wavelength 8.0 μm, 8.5 μm, 9.0 μm, etc. is achieved during the continuous tuning process.

The trigger unit advantageously has separate inputs for the two trigger signals. The two trigger signals are adapted in the trigger unit, then added and suitably mixed with the reference signal. This means that the two trigger signals and the reference signal can be detected simultaneously in one channel.

Compared to the state of the art, there are clear advantages with regard to the efficiency of the calibration of measurement data.

With the optical device, a universally applicable calibration method can be used, regardless of the laser modules used and their wavelength. The technology can be used for both pulsed and continuous laser operation and is advantageously independent of the line width of the laser.

A minimum possible number of data acquisition channels and detectors is sufficient to capture a wavelength calibration, an intensity calibration and a measurement signal synchronously, in particular simultaneously. Particularly in the case of high measurement rates and low expected signal intensities, the costs for an additional data acquisition channel that would otherwise be necessary are high. Compared to other systems, the system costs can advantageously be significantly reduced with the optical device according to the invention.

The detection of the scan trigger enables a reliable, automated separation of the individual scan ranges even with high measurement rates and/or low signal intensities at the signal detector.

A modular system structure is possible. Measurement and data acquisition can be decoupled and independent of each other. Even with high measurement rates, this allows for fast data acquisition and processing of the measurement signals.

A wavelength calibration of the captured absorption spectra can be carried out particularly advantageously with the optical device according to the invention.

Wavelength calibration is particularly beneficial because, for example, the motors that move a grating in the laser cavity to tune the wavelength range usually do not move at a constant or repeatable speed, and a wavelength change inevitably occurs during the tuning process.

Furthermore, several laser modules are often used in one laser in order to be able to cover a larger wavelength range in the mid-infrared spectral range (MIR range). During the tuning, the individual modules are switched at defined wavelengths. Although no laser light is emitted, the signal detector is still continuously acquiring data during this time. For these reasons, the mapping of the time stamps of the measured measurement signals is non-linear and usually injective on a wavelength scale, so that a conversion in the subsequent processing of the data (post-processing) is initially not possible. These disadvantages can be circumvented with the proposed optical device.

Advantageously, the wavelength of the laser can be tuned over a wide spectral range, for example in the MIR range over a spectral range that is several μm wide, for example from 6 to 11 μm. Unlike a diode laser, the wavelength of which is set by a defined temperature and current and can therefore typically be shifted by a few nanometers, the wavelength of an advantageous quantum cascade laser can be tuned over several μm. In the case of the advantageous quantum cascade laser, the current strength used has primarily an influence on the intensity of the emitted laser power. Advantageously, the optical device can be used to change the wavelength via an optical grating.

This advantageously allows tuning over a very broad spectral wavelength range. The current can remain constant within a module during a scan.

The signal can be acquired unidirectionally by the data acquisition unit without a feedback loop.

A continuous measurement is carried out, namely the trigger signals for scan and wavelength triggers are output continuously and are only stopped when the measurement is ended.

The wavelength trigger signal can be used for wavelength calibration. Therefore, for example, no reference gas is required for wavelength calibration.

According to an advantageous configuration of the optical device, the trigger unit can have one or more level adaptation components which are designed to adjust a level of the trigger signals, in particular of the first and second trigger signals, to a level of the reference signal. The signal levels of the two digital trigger signals (for example 0V and 2V) of the laser, for example the scan trigger and the wavelength trigger, can advantageously first be optimally adapted to the subsequent measurement configuration in the trigger unit. Depending on the level of the reference signal, both are usually attenuated (resistor circuit) but can also be amplified (amplifier circuit) if necessary. In this way, it can be ensured that, despite originally different signal levels between the three channels, it is possible to recognize all the individual signals on the measurement signal.

According to an advantageous configuration of the optical device, the mixer can be designed as a bias-T mixer. By means of a so-called bias-T mixer, the slowly changing, added trigger signal can be combined advantageously with the high-frequency and therefore rapidly changing signal from the reference detector.

According to an advantageous configuration of the optical device, the adder can be designed as an analog adder. An analog adder performs addition operations particularly quickly and is relatively easy to implement.

According to an advantageous configuration of the optical device, the laser can be designed to output a third trigger signal, which indicates a direction of the wavelength change when tuning the laser. In this case, the trigger unit can have a further input for detecting the third trigger signal, with which the trigger unit detects the direction of the change in wavelength of the wavelength scan of the laser light. By means of the third trigger signal, the scanning direction can advantageously also be detected in the case of a bidirectional wavelength scan.

According to an advantageous configuration of the optical device, the laser can be designed as a quantum cascade laser. A quantum cascade laser has a higher signal-to-noise ratio than other commonly used lasers.

According to an advantageous embodiment of the optical device, the data acquisition unit can be designed to acquire the trigger output signal and the measurement signal synchronously in time.

Due to the small number of ADCs required, the data acquisition can be carried out synchronously, since multiplexing of different channels, which are not very suitable for such time-critical applications, can be dispensed with.

According to an advantageous embodiment of the optical device, time-synchronous wavelength calibration and/or time-synchronous intensity calibration of the wavelength ranges of the time-dependent measurement signals can be provided.

A wavelength calibration and intensity calibration can advantageously be carried out synchronously, in particular simultaneously, and a measurement signal can be detected with a small, in particular minimal possible number of data acquisition channels and detectors.

According to a further aspect of the invention, a trigger unit for processing at least a first trigger signal, a second trigger signal and a reference signal of a tunable laser of an optical device for capturing infrared absorption spectra is proposed, having at least one input for the first trigger signal and at least one input for the second trigger signal and an input for the reference signal and at least one output for a trigger output signal, and an adder designed to add the trigger signals and a mixer designed to mix the trigger signals with the reference signal to form the trigger output signal.

The proposed trigger unit can advantageously be used for an efficient type of wavelength calibration. A wavelength calibration and power calibration is possible with only one single reference detector and a single ADC channel, so that only two data acquisition channels are required for the measurement. In this case, a so-called digital scan trigger is used as the first trigger signal, and a so-called wavelength trigger is used as the second trigger signal, which signals are provided by the laser during the scanning process.

The scan trigger as the first trigger signal is synchronized with the emitted wavelength scan in such a way that the scan trigger outputs a temporal start and end of a wavelength scan.

The wavelength trigger as the second trigger signal can have a pattern of scanning pulses distributed over the defined wavelength range of the wavelength scan at predetermined, in particular equal, wavelength intervals, so that the wavelength corresponding to each scanning pulse is known. Depending on the setting, individual digital pulses can be output within a specific wavelength range and wavelength interval. For example, when scanning in the wavelength range of 7.9-11.1 μm, in the range of 8.0-11.0 μm, scanning pulses are output at intervals of 0.5 μm as wavelength triggers as soon as the wavelength 8.0 μm, 8.5 μm, 9.0 μm, etc. is achieved during the tuning process.

The trigger unit advantageously has separate inputs for the two trigger signals. The two trigger signals are adapted in the trigger unit, then added and suitably mixed with the reference signal. This means that the two trigger signals and the reference signal can be detected simultaneously in one channel.

According to an advantageous embodiment, the trigger unit can include level adaptation components that are designed to adapt a level of the trigger signals to a level of the reference signal. The signal levels of the two digital trigger signals (for example 0V and 2V) of the laser, for example the scan trigger and the wavelength trigger, can advantageously first be optimally adapted to the subsequent measurement configuration in the trigger unit. Depending on the level of the reference signal, both are usually attenuated (resistor circuit) but can also be amplified (amplifier circuit) if necessary.

In this way, it can be ensured that, despite originally different signal levels between the three channels, it is possible to recognize all the individual signals on the measurement signal.

According to an advantageous configuration of the trigger unit, the mixer can be designed as a bias-T mixer. By means of a so-called bias-T mixer, the slowly changing, added trigger signal can be combined advantageously with the high-frequency and therefore rapidly changing signal from the reference detector.

According to an advantageous embodiment, the trigger unit can include a further input for detecting a third trigger signal in order to detect the direction of the change in wavelength of the tunable wavelength ranges of the reference signal. With the third trigger signal, the trigger unit can detect the direction of wavelength change of the wavelength scan of the laser light. In this way, the scanning direction can advantageously also be detected in the case of a bidirectional wavelength scan.

According to an advantageous embodiment of the trigger unit, bidirectional wavelength scans of the laser light can be processed. The direction of the wavelength change of the wavelength scan can be detected by means of a scan direction trigger signal and taken into account in the evaluation of the measurement signals.

According to an advantageous embodiment of the trigger unit, the adder can be designed as an analog adder. An analog adder performs addition operations particularly quickly and is relatively easy to implement.

According to a further aspect of the invention, a method for capturing infrared absorption spectra with an optical device is proposed, comprising at least the steps of emitting laser light from a laser as a wavelength scan over a defined wavelength range onto a sample; detecting reference signals of a reference detector, and of first and second trigger signals of the laser in a trigger unit, wherein the first trigger signal outputs a temporal start and a temporal end of a wavelength scan and the second trigger signal comprises a pattern of scanning pulses distributed over the defined tunable wavelength range at predetermined, in particular equal, wavelength distances; adding the trigger signals in the trigger unit and mixing them with the reference signals, outputting them as trigger output signals; detecting measurement signals from a measurement detector of the laser light scattered by the sample and the trigger output signals in a data acquisition unit; cutting out the time-dependent measurement signals of the individual wavelength scans of the laser light using a first trigger signal; converting the time-dependent trigger output signal into a wavelength-dependent reference spectrum using a second trigger signal;

converting the time-dependent measurement signals into a wavelength-dependent measurement spectrum using the second trigger signal; normalizing the frequency-dependent measurement spectrum to form a normalized measurement spectrum using the reference spectrum; and determining an absorption spectrum.

Laser light from the laser is radiated onto a sample as so-called wavelength scans over defined, tunable wavelength ranges, and laser light scattered by the sample is registered again by the optical device.

In parallel, reference signals detected by a reference detector in a reference beam path are recorded by a trigger unit. The reference detector detects the individual pulse trains, preferably for example with a frequency of at least 1 MHz and a pulse duration of at most 100 ns, which are emitted by the laser. In principle, however, lower frequencies and longer pulse intervals can be used.

The laser emits at least two trigger signals, namely a scan trigger as the first trigger signal and a wavelength trigger as the second trigger signal. The scan trigger as the first trigger signal is synchronized with the emitted wavelength range in such a way that the scan trigger outputs a temporal start and end of a wavelength scan. The scan trigger indicates, for example, that the laser has moved to the desired wavelength position and is emitting laser light.

The wavelength trigger as the second trigger signal has a pattern of scanning pulses distributed over the defined wavelength range of the wavelength scan at predetermined, in particular equal, wavelength intervals, so that the wavelength corresponding to each scanning pulse is known. Depending on the setting, individual digital pulses can be output within a specific wavelength range and wavelength interval.

The two trigger signals are also detected by the trigger unit and added analog-electronically after an optional level adaptation.

The next step consists in or comprises mixing with the reference signal from the reference detector. By means of a so-called bias-T mixer, the slowly changing, added trigger signal can be combined advantageously with the high-frequency and therefore rapidly changing signal from the reference detector.

The combined signal generated in this way can then be captured in the data acquisition parallel to the measurement signal from the sample.

With the data recorded in this way, a simple and rapid wavelength calibration and also intensity calibration of the individual measurement spectra in real time is possible with only two data acquisition channels, namely the measurement signals and the reference signals.

Using the method according to the invention, the measurement with the tuning of the laser wavelength can be completely decoupled from the data acquisition and further processing.

In the first step of data processing, an absorption spectrum is now calculated from the captured time transients by the trigger signals modulated by the trigger unit being demodulated again by the software.

In a first step, the individual wavelength scans are separated using the first trigger signal, the scan trigger, which is interrupted between the wavelength scans, for example when the grating of the laser returns to the starting position, and also when the laser module is changed. The periods of time in which the laser does not emit or no information is acquired for the actual absorption measurement are cut out and not taken into account.

The time stamps of the second trigger signals, the individual wavelength triggers, are then determined, With the help of these, the time transient is now converted into a spectrum by projecting the known wavelengths of the wavelength triggers onto the time stamp of the measurement using an injective mapping. The time interval between two wavelength trigger signals varies, which is why the number of measurement points between different wavelength triggers also changes. Using a suitable, so-called binning method, the data can be adjusted in such a way that the measurement points are equidistant on the time axis. The reference spectrum is thus calibrated.

Using the time stamp, the wavelength trigger signals can be projected not only with the reference signal but also with the measurement signal. A fully calibrated absorption spectrum is thus obtained.

In addition to the wavelength calibration, an intensity calibration can be carried out using the reference measurement. As a result, the absorption spectrum is determined exclusively from the absorption behavior of the sample or the atmosphere between the optical device and the sample. Changes within the optical device, such as changes in the laser power, non-linearity of the detectors, can be compensated with this method.

The prerequisite for this is that the detectors are calibrated once in relation to one another and the transfer function is therefore known. For this purpose, so-called neutral density (ND) filters with different degrees of attenuation can be placed in the beam path immediately after the laser output and the spectra can be measured in both channels as a reference signal and measurement signal and plotted against the respective ND filter value.

By means of appropriate interpolation, the relationship to the expected electrical reference voltage can be determined for a measured signal voltage for any wavelength in relation to the calibration measurement carried out once. In particular, this compensates for non-linear detector behavior.

The actual absorption spectrum can be calculated on this basis using a corresponding evaluation algorithm.

According to an advantageous embodiment of the method, the trigger output signal can be demodulated to reconstruct the first trigger signal and the second trigger signal as well as the reference signal. In this way, the measurement with the tuning of the laser wavelength can be completely decoupled from the data acquisition and further processing.

An absorption spectrum can be calculated from the detected time transients, in that the trigger signals modulated by the trigger unit are demodulated again by the software.

According to an advantageous embodiment of the method, the absorption spectrum can be determined from the normalized measurement spectrum using calibration data or previously created conversion tables of the reference detector and the signal detector. In addition to the wavelength calibration, an intensity calibration can be carried out using the reference measurement. As a result, the absorption spectrum is determined exclusively from the absorption behavior of the sample or the atmosphere between the optical device and the sample.

According to an advantageous embodiment of the method, the calibration data can be determined from measurements of reference signals and measurement signals with different filters at the output of the laser. The prerequisite for this is that the detectors are calibrated once in relation to one another and the transfer function is therefore known. For this purpose, ND filters with different degrees of attenuation can be placed in the beam path immediately after the laser output and the spectra can be measured in both channels as a reference signal and measurement signal and plotted against the respective ND filter value.

According to an advantageous embodiment of the method, the time-dependent measurement signals and the time-dependent trigger output signals can be detected synchronously.

Due to the small number of ADCs required, the data acquisition can be carried out synchronously, since multiplexing of different channels, which are not very suitable for such time-critical applications, can be dispensed with.

According to an advantageous embodiment of the method, a time-synchronous wavelength calibration and/or intensity calibration of the time-dependent measurement signals can be carried out. A wavelength calibration and intensity calibration can thus advantageously be carried out simultaneously/synchronously, and a measurement signal can be detected with a minimal possible number of data acquisition channels and detectors.

BRIEF DESCRIPTION OF THE DRAWINGS

Further advantages will be apparent from the following description of the drawings. Exemplary embodiments of the invention are shown in the figures. The figures, the description, and the claims contain numerous features in combination. A person skilled in the art will expediently also consider the features individually and combine them into further meaningful combinations.

In the exemplary figures:

FIG. 16 shows a flow chart of a method for capturing infrared absorption spectra with an optical device according to an exemplary embodiment of the invention.

DETAILED DESCRIPTION

Figure 1:
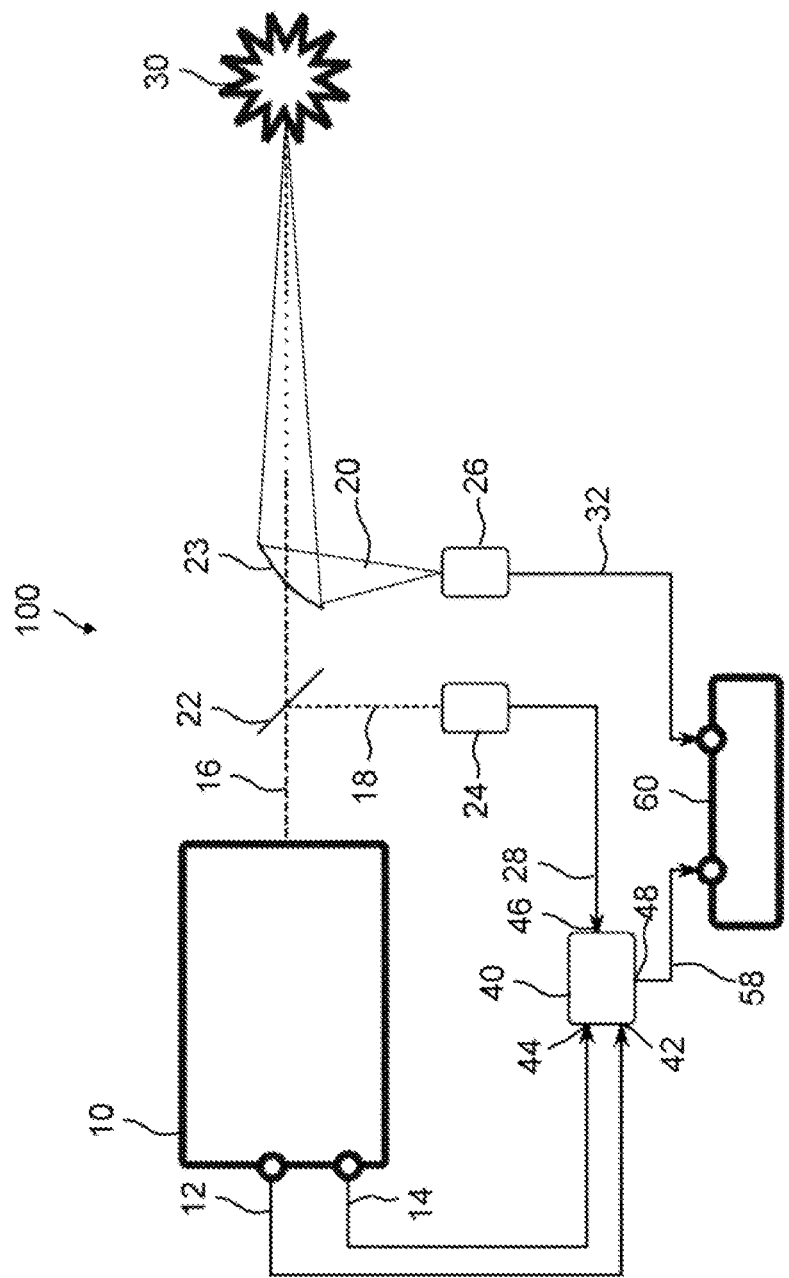
FIG. 1 shows a schematic structure of an optical device for capturing infrared absorption spectra of a sample according to an exemplary embodiment of the invention.

In the figures, identical or identically acting components are identified by the same reference numerals. The figures only show examples and are not to be understood as restrictive.

Directional terminology used in the following with terms such as "left", "right", "above", "below", "in front of", "behind", "after", and the like only serves for better comprehension of the figures and is in no way intended to restrict the generality. The components and elements shown, their design and use can vary according to the considerations of a person skilled in the art and can be adapted to the respective applications.

FIG. 1 shows a schematic structure of an optical device for capturing infrared absorption spectra of a sample 30 according to an exemplary embodiment of the invention.

The optical device 100 comprises a laser 10 that can be tuned in terms of its emitted wavelength, in particular a quantum cascade laser, which is designed for repeated irradiation of laser light 16 as a wavelength scan over a defined wavelength range as a wavelength scan onto the sample 30.

The optical device 100 also includes a reference detector 24 in a reference beam path 18 in which part of the emitted laser light 16 is emitted via a partially transparent mirror 22 and received by the reference detector 24 and converted into a reference signal 28.

The optical device 100 further comprises a signal detector 26 which receives laser light 20 scattered on the sample 30 and converts it into a measurement signal 32. The laser light 16 is sent from the laser 10 onto the sample 30. The scattered laser light 20 is focused onto the signal detector 26 via a focusing mirror 23, for example. The mirror 23 can also be designed as a telescope or as a lens unit. The signal detector 26 converts the received laser light 20 into a measurement signal 32.

The optical device 100 also comprises a trigger unit 40 with at least one input 42, 44 for two trigger signals 12, 14, at least one input 46 for the reference signal 28 and at least one output 48 for a trigger output signal 58.

The optical device 100 also comprises a data acquisition unit 60, which is designed to acquire a trigger output signal 58 and the measurement signal 32, in particular synchronously.

The laser 10 outputs at least a first trigger signal 12 and a second trigger signal 14. The first trigger signal 12 is synchronized with the emitted wavelength scan, and the second trigger signal 14 has a pattern of scanning pulses 38 distributed over the defined wavelength range of the wavelength scan at predetermined, in particular equal, wavelength intervals. Thus, the wavelength corresponding to each sample pulse 38 is known.

Figure 2:
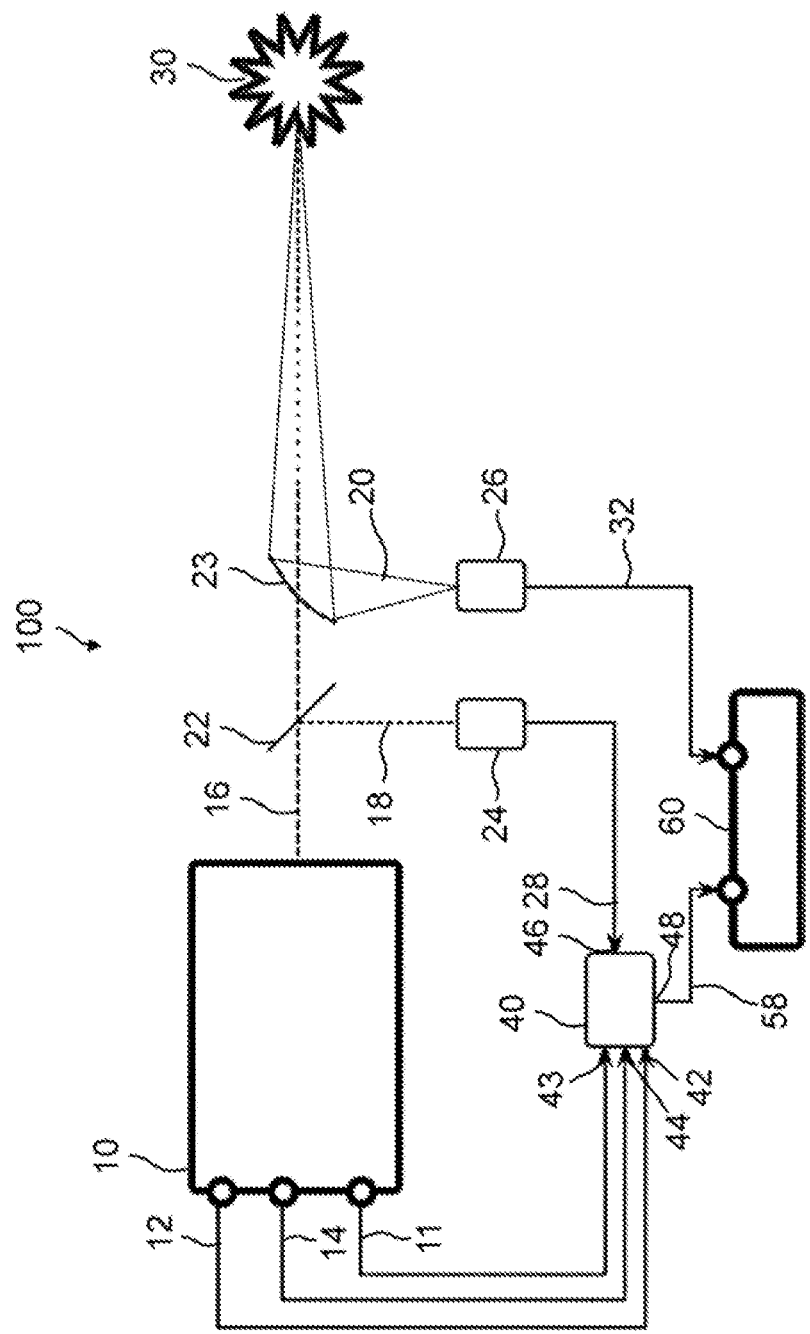
FIG. 2 shows a schematic structure of an optical device for capturing infrared absorption spectra of a sample according to a further exemplary embodiment of the invention.

FIG. 2 shows a schematic structure of an optical device 100 for capturing infrared absorption spectra of a sample 30 according to a further exemplary embodiment of the invention.

The laser 10 can additionally be designed to output a third trigger signal 11 which indicates a direction of the wavelength change when the laser 10 is tuned. In this case, the trigger unit 40 can have a further input 43 for detecting the third trigger signal 11, with which the trigger unit 40 detects the direction of the change in wavelength of the wavelength scan of the laser light 16. This advantageously allows bidirectional wavelength scans of the laser light 16 to be processed.

Figure 3:
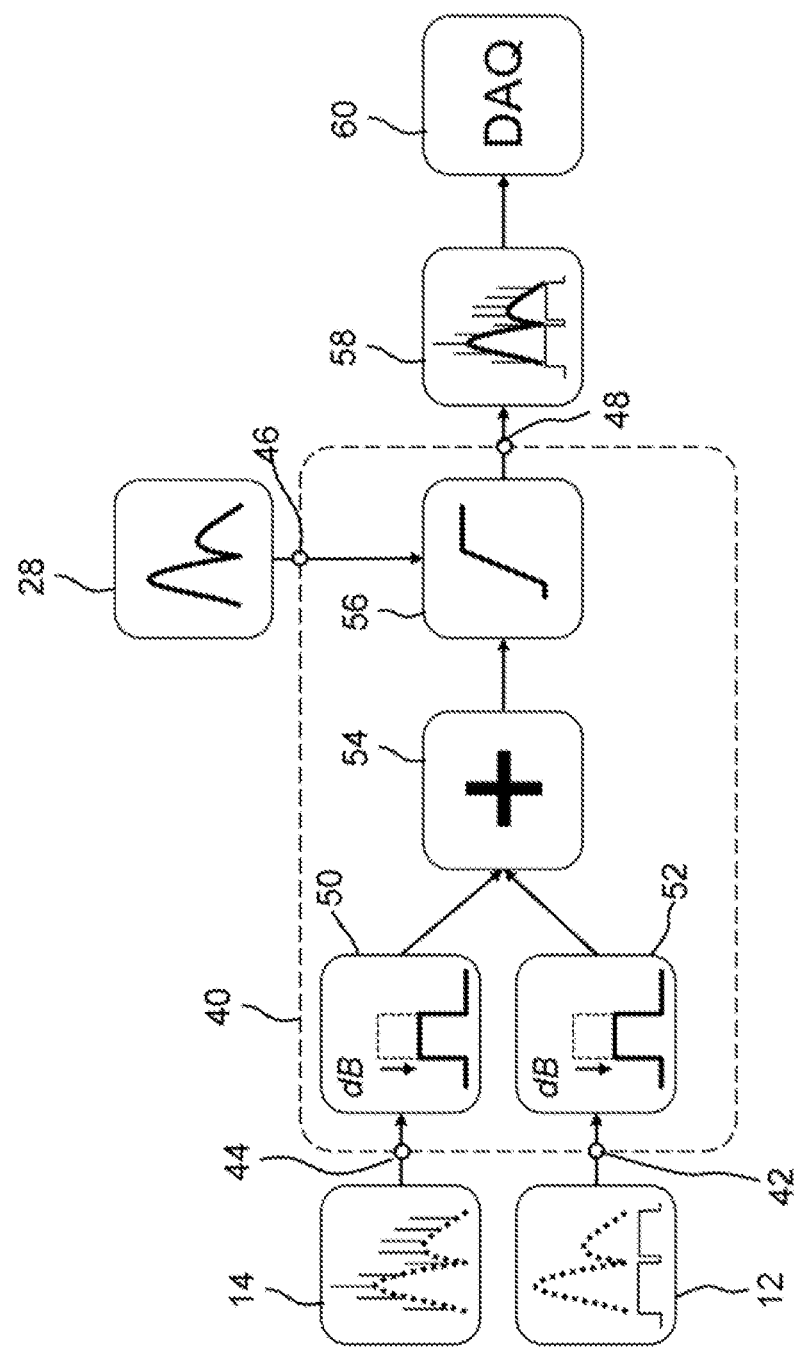
FIG. 3 shows a schematic representation of the operation of a trigger unit according to an exemplary embodiment of the invention.

FIG. 3 shows a schematic representation of the operation of a trigger unit 40 according to an exemplary embodiment of the invention. Such a trigger unit 40 is preferably used in an optical device 100 according to FIG. 1.

The trigger unit 40 is used to process at least the first trigger signal 12, the second trigger signal 14 and the reference signal 28 of the tunable laser 10. The trigger unit

40 has an input 42 for the first trigger signal 12, an input 44 for the second trigger signal 14 and an input 46 for the reference signal 28, and an output 48 for a trigger output signal 58.

The trigger unit also has an adder 54, which is designed to add the trigger signals 12, 14, and a mixer 56, which is designed to mix the trigger signals 12, 14 with the reference signal 28 to form the trigger output signal 58. The mixer 56 can preferably be configured as a bias-T mixer, while the adder 54 can preferably be configured as an analog adder.

Furthermore, the trigger unit 40 has level adaptation components 50, 52 which are designed to adapt a level of the first and second trigger signals 12, 14 to a level of the reference signal 28.

It is possible by means of the trigger unit 40 to carry out a time-synchronous wavelength calibration and/or time-synchronous intensity calibration of the wavelength ranges of the time-dependent measurement signals 32.

Figure 4:
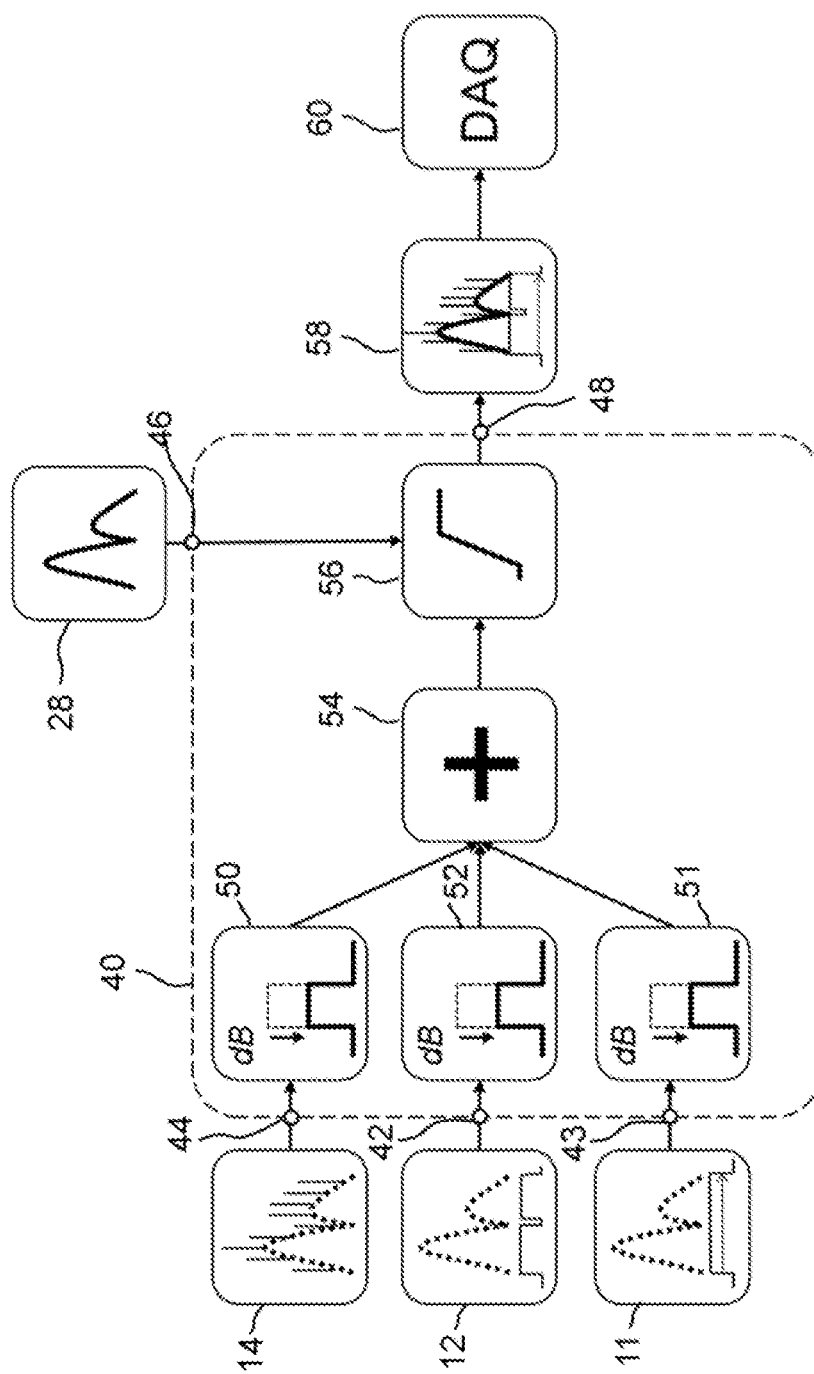
FIG. 4 shows a schematic representation of the operation of a trigger unit according to a further exemplary embodiment of the invention.

FIG. 4 shows a schematic representation of the operation of a trigger unit 40 according to a further exemplary embodiment of the invention. Such a trigger unit 40 is preferably used in an optical device 100 according to FIG. 2, in which the laser 10 is designed to additionally emit a third trigger signal 11, which indicates a direction of the wavelength change when tuning the laser 10.

With the third trigger signal 11, the trigger unit 40 detects the direction of wavelength change of the wavelength scan of the laser light 16.

The trigger unit 40 is used in this exemplary embodiment to process at least the first trigger signal 12, the second trigger signal 14, the third trigger signal 11 and the reference signal 28 of the tunable laser 10. The trigger unit 40 has an input 42 for the first trigger signal 12, an input 44 for the second trigger signal 14, an input 43 for the third trigger signal 11 and an input 46 for the reference signal 28, and an output 48 for a trigger output signal 58.

Furthermore, the trigger unit 40 has level adaptation components 50, 52 which are designed to adapt a level of the first, second and third trigger signals 12, 14, 11 to a level of the reference signal 28.

The trigger unit also has an adder 54, which is designed to add the trigger signals 12, 14, 11 and a mixer 56, which is designed to mix the trigger signals 12, 14, 11 with the reference signal 28 to form the trigger output signal 58. The mixer 56 can preferably be embodied as a bias-T mixer, while the adder 54 can preferably be embodied as an analog adder.

It is possible by means of the trigger unit 40 to carry out a time-synchronous wavelength calibration and/or time-synchronous intensity calibration of the wavelength ranges of the time-dependent measurement signals 32. Due to the use of the third trigger signal 11, advantageously bidirectional wavelength scans of the laser light 16 can be processed.

Figure 5:
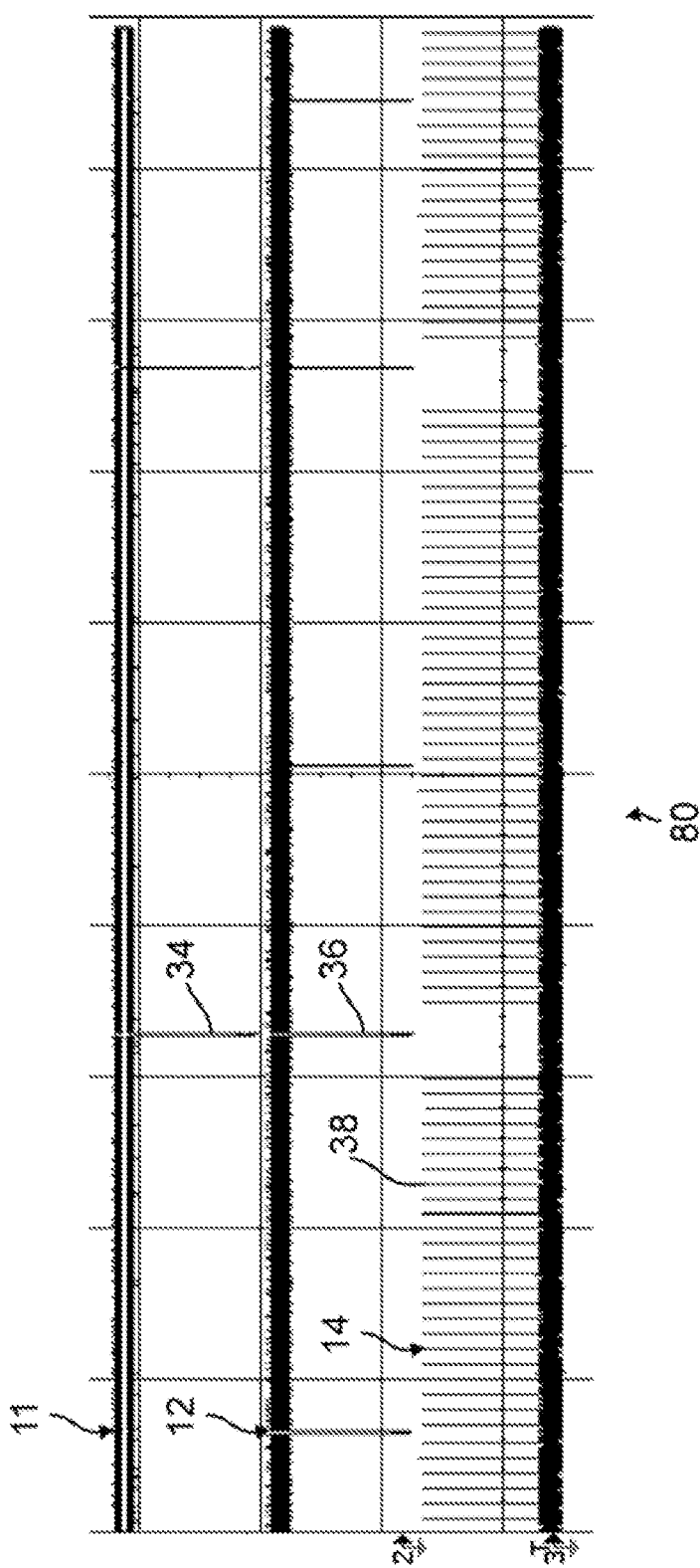
FIG. 5 shows trigger signals of a laser of an optical device according to FIG. 1.

Digital trigger signals 11, 12, 14 of the laser 10 of the optical device 100 are shown in a time sequence 80 in FIG. 5.

The scan trigger as the first trigger signal 12 is synchronized with the emitted wavelength range in such a way that the scan trigger outputs a temporal start and end of a wavelength scan. The scan trigger indicates that the laser 10 is actively scanning and emitting laser light at the same time. Active scanning means that the wavelength of the laser 10 is changed from a start value to an end value, in particular is changed continuously or in steps. The scan trigger thus indicates whether a laser module is currently active. For example, when starting up the laser 10 or when changing a laser module, the scan trigger has an electrical LOW signal, while the scan trigger has an electrical HIGH signal when passing through a laser module. A LOW signal corresponds to 0 V, for example, and a HIGH signal to 2 V, for example. This means that the signals from the individual laser modules can later be separated from one another. The scan trigger 12 indicates, for example, that the laser 10 has moved to the desired wavelength position and is emitting laser light. The first trigger signal 12 signals this through the pulses 36.

The wavelength trigger 14 as the second trigger signal has a pattern of scanning pulses 38 distributed over the defined wavelength range of the wavelength scan at predetermined, in particular equal, wavelength intervals, of which only one is shown for clarity, so that the wavelength corresponding to each scanning pulse 38 is known. Depending on the setting, individual digital pulses 38 can be output within a specific wavelength range and wavelength interval.

The direction of the wavelength change of the wavelength scan can be detected by means of a scan direction trigger signal as the third trigger signal 11 and taken into account in the evaluation of the reference signals 28 and measurement signals 32. For example, the third trigger signal 11 may be high (2V) when the wavelength scan occurs from low to high wavelengths and low (0V) when the wavelength scan is in the reverse direction. If scanning is unidirectional and the scanning direction is therefore not changed during the measurement, it is sufficient to use the first two trigger signals 12, 14, namely the scan trigger and the wavelength trigger, for the evaluation of the measurement data. The pulses 34 of the third trigger signal 11 each indicate a change in direction of the scan.

The signal levels of the two digital trigger signals 12, 14 (for example 0V and 2V) of the laser 10, for example the scan trigger 12 and the wavelength trigger 14, can advantageously first be optimally adapted to the subsequent measurement configuration in the trigger unit 40. Depending on the level of the reference signal 28, both are usually attenuated (resistor circuit) but can also be amplified (amplifier circuit) if necessary. In this way, it can be ensured that, despite originally different signal levels between the three channels 12, 14, 28, it is possible to recognize all the individual signals on the reference signal 28 and measurement signal 32.

The two trigger signals 12, 14 are also detected by the trigger unit 40 and added analog-electronically after an optional level adaptation.

In the next step, mixing with the reference signal 28 with the reference detector 24 takes place. The slowly changing added trigger signal 12, 14 can be combined with the high-frequency and thus rapidly changing signal from the reference detector 24 by means of a so-called bias-T mixer.

The combined trigger output signal 58 generated in this way is then acquired in the data acquisition parallel to the measurement signal 32 from the sample.

With the data recorded in this way, a simple and rapid wavelength calibration and also intensity calibration of the individual measurement spectra in real time is possible with only two data acquisition channels, namely the measurement signals 32 and the reference signals 28.

Figure 6:
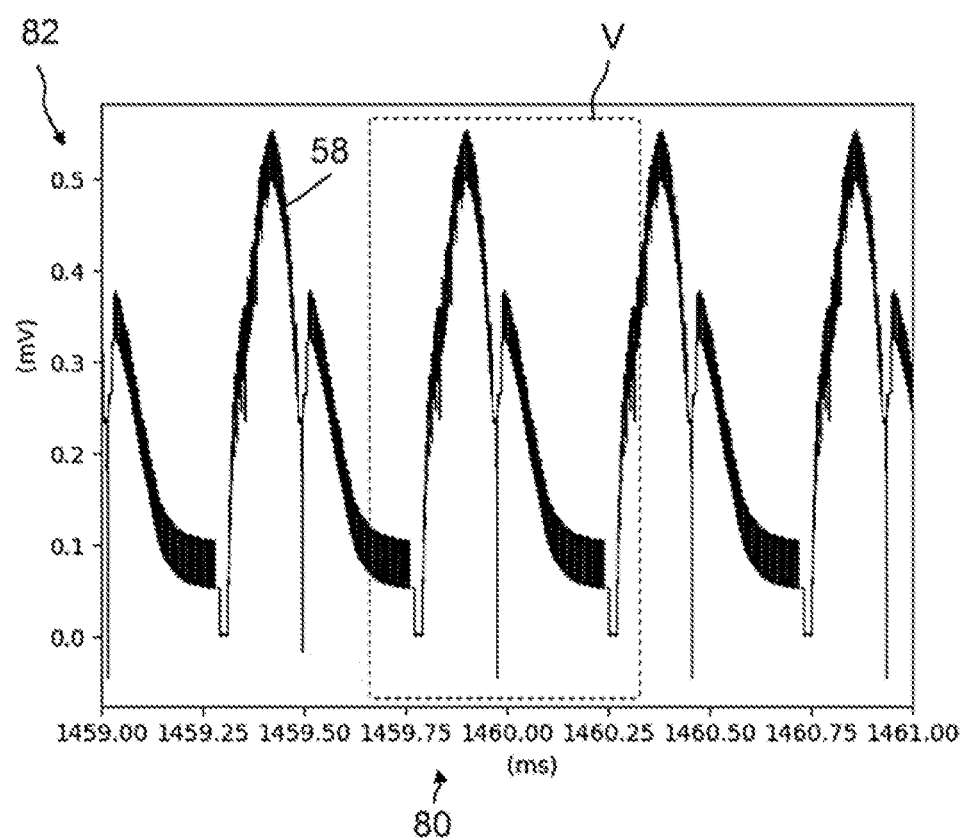
FIG. 6 shows trigger output signals of a trigger unit over multiple wavelength scans according to an exemplary embodiment of the invention.
Figure 7:
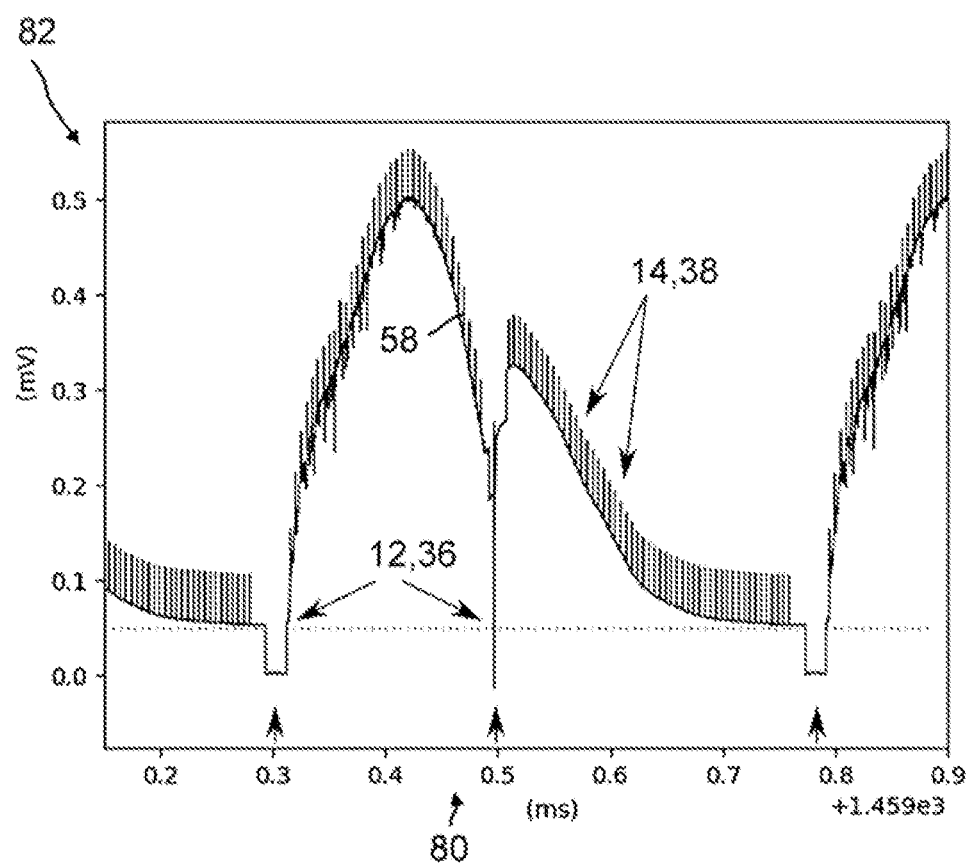
FIG. 7 shows a section of a wavelength scan of the trigger output signals according to FIG. 6.

The resulting intensity curve of the reference spectrum using the trigger module is shown in FIG. 6 as trigger output signals 58 of the trigger unit 40 over a number of wavelength scans. The course of the intensity is shown as a voltage value 82 in the form of a number of successive wavelength scans as a function of time 80. A section V of a wavelength scan of the trigger output signals 58 in FIG. 6 can be seen in FIG. 7.

The pulses of the two trigger signals 12, 14 are identified as examples in the intensity profile. Arrows above the time scale 80 mark the points in time at which the data acquisition continues, although no laser light 16 is emitted due to the laser module change and the data therefore contain no information.

In the first step of data processing, an absorption spectrum is now calculated from the captured time transients by the trigger signals 12, 14 modulated by the trigger unit 40 being demodulated again by the software.

Figure 8:
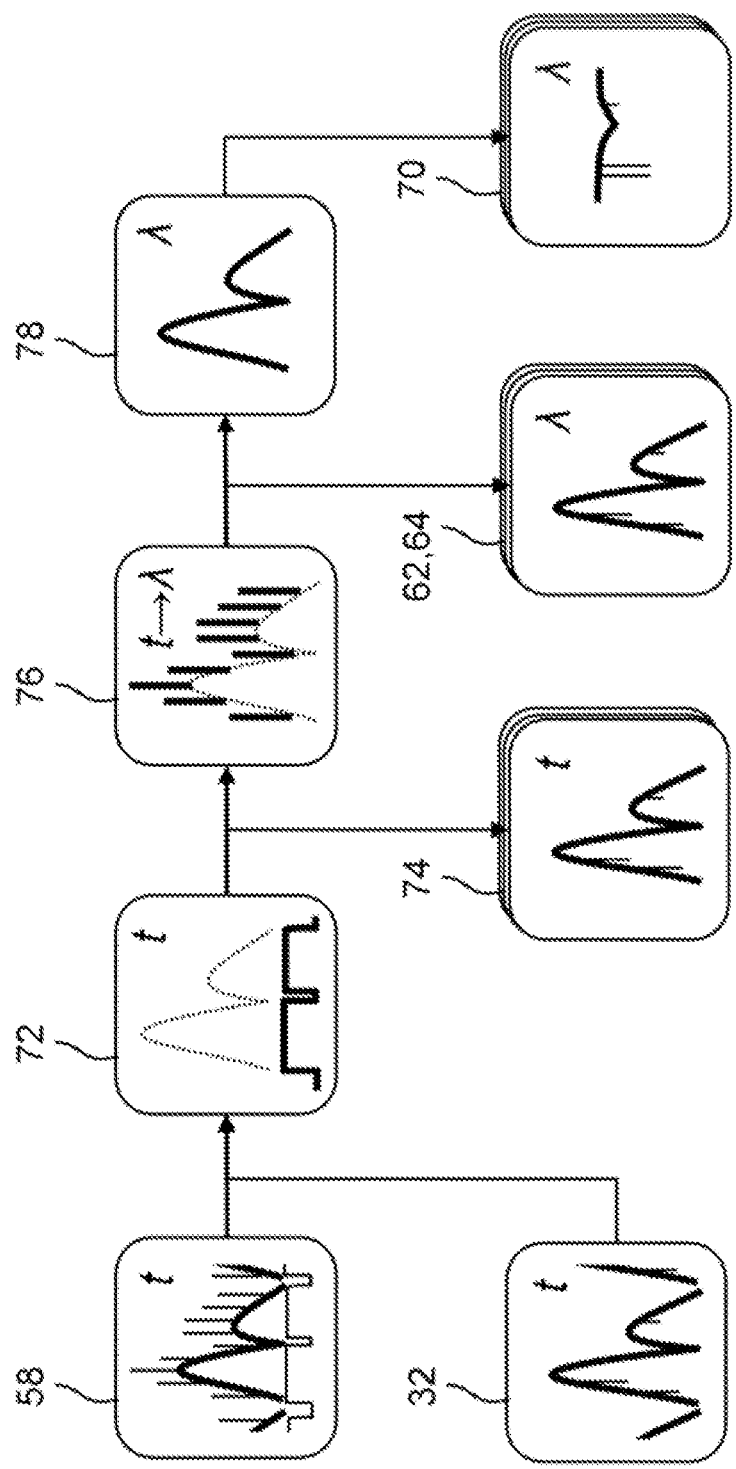
FIG. 8 shows a process flow during data evaluation according to the method according to the invention for capturing infrared absorption spectra with an optical device.

FIG. 8 shows a process sequence when evaluating the measurement data according to the method according to the invention.

First, in process step 72, the individual wavelength scans of trigger output signals 58 and measurement signals 32 are separated using the scan trigger as first trigger signal 12. The trigger signal 12 is interrupted in each case between the wavelength scans, for example by a return of the grating of the laser when tuning, to the starting position, and also when the laser module is changed. The periods of time, in which the laser does not emit or no information is acquired for the actual absorption measurement, are cut out and not taken into account. The individual time-dependent measurement signal scans 74 result from this process step 72.

The time stamps of the individual wavelength triggers are then determined as the second trigger signals 14 in process step 76. With the help of these, the time transient of the measurement signal scans 74 is now converted into a spectrum 64 by projecting the known wavelengths of the wavelength triggers 14 onto the time stamps of the measurement signals 74 using an injective mapping. The time interval between two wavelength trigger pulses 38 varies, which is why the number of measurement points between different wavelength trigger pulses 38 also changes. Using a suitable, so-called binning method, the data can be adjusted in such a way that the measurement points are equidistant on the wavelength axis 84. The reference spectrum 62 is thus calibrated.

Figure 9:
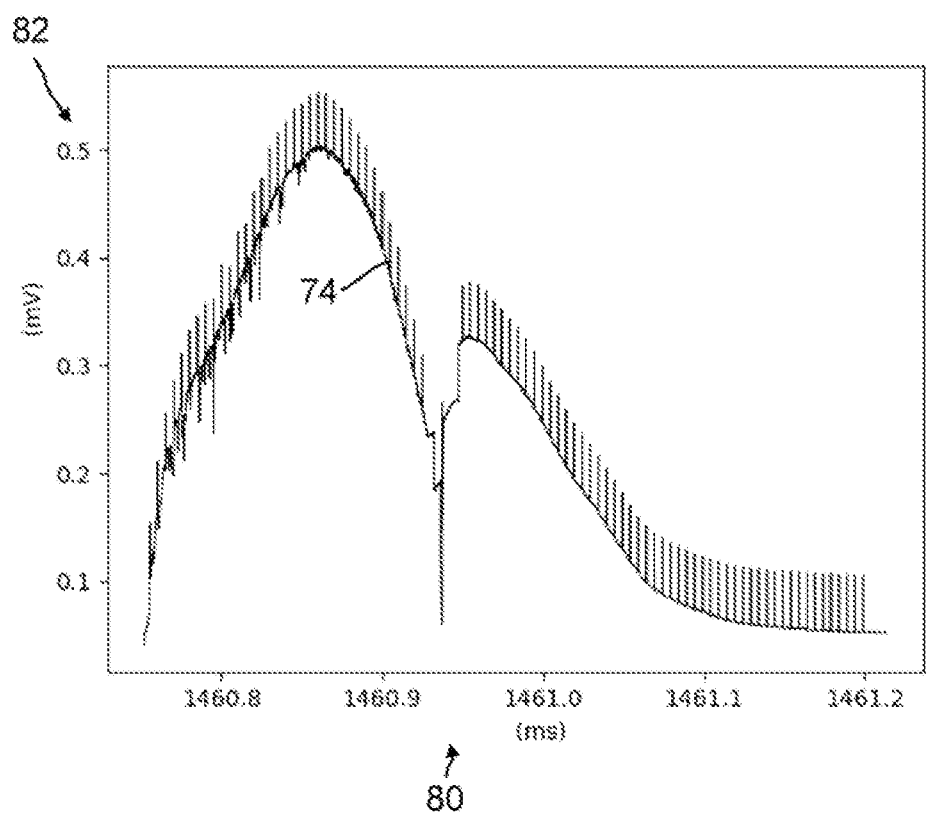
FIG. 9 shows an intensity profile of a single wavelength scan with the second trigger signals after the successive wavelength scans have been separated by means of the first trigger signals.

FIG. 9 shows an intensity curve 82 of a wavelength scan 74 of the reference signal 28 with the second trigger signals 14 after the separation of the successive wavelength scans 74 by means of the first trigger signals 12.

Using the time stamp, the wavelength trigger pulses 38 can be projected not only with the reference signal 28 but also with the measurement signal 32. A fully calibrated absorption spectrum 64 is thus obtained.

Figure 10:
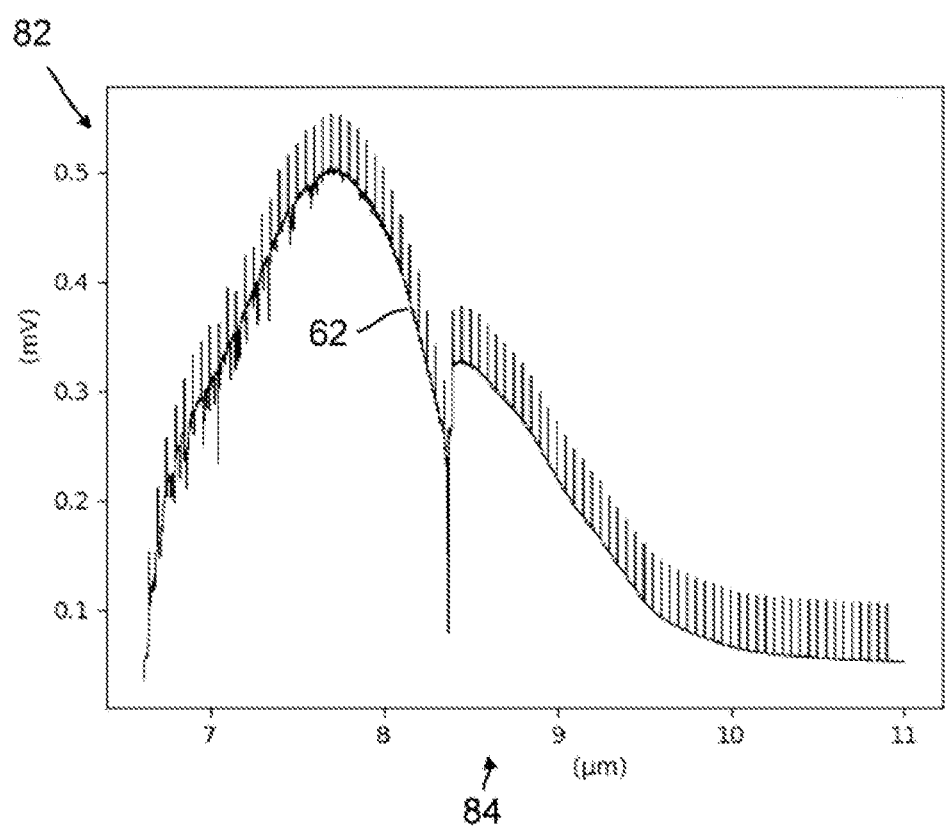
FIG. 10 shows an intensity profile of an individual wavelength scan of a reference signal after the wavelengths have been associated with the second trigger signals.

FIG. 10 shows an intensity profile 82 of a wavelength scan 62 of a reference signal 28 as a function of the wavelength 84 after the wavelengths have been associated with the second trigger signals 14.

Figure 11:
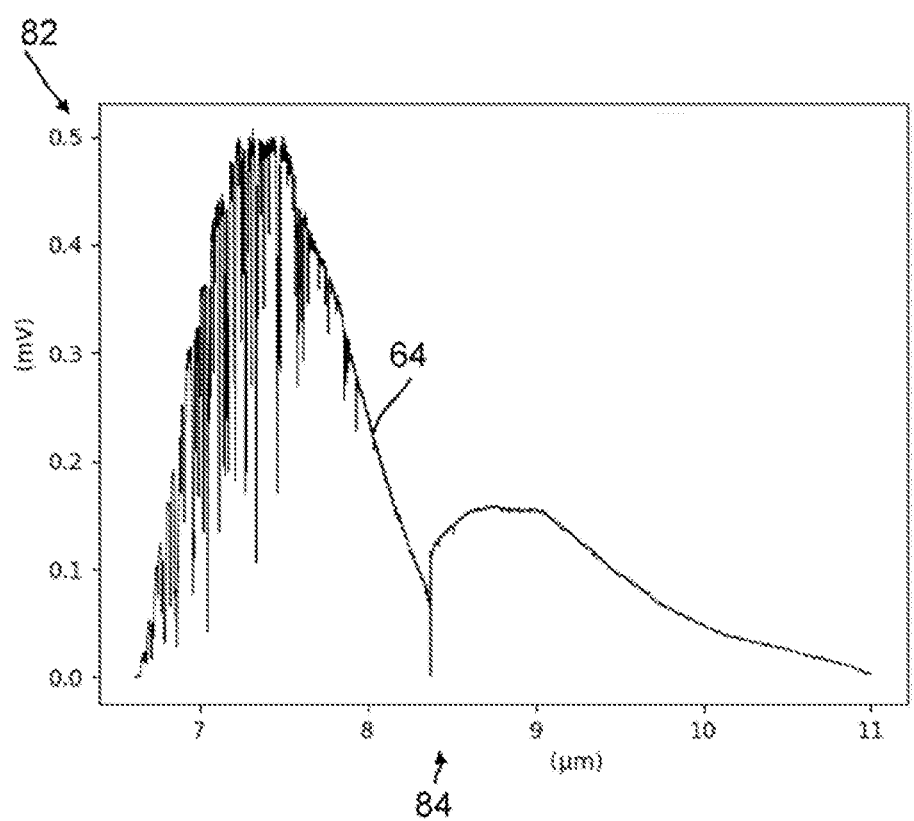
FIG. 11 shows a spectrum of a wavelength scan after wavelength calibration.

FIG. 11 shows a spectrum 64 of a wavelength scan of a measurement signal 32 after the wavelength calibration.

In a subsequent process step 78 (see FIG. 8), in addition to the wavelength calibration based on the reference measurement, an intensity calibration can be carried out in order to obtain a normalized absorption spectrum 70 from the calibrated absorption spectrum 64, which is exclusively determined by the absorption behavior of the sample 30 or the atmosphere between optical device 100 and sample 30 is determined. Changes within the optical device 100, such as changes in the laser power, non-linearity of the detectors 24, 26, can be compensated with this method.

The prerequisite for this is that the detectors 24, 26 are calibrated once in relation to one another and the transfer function is therefore known. For this purpose, so-called neutral density (ND) filters with different degrees of attenuation can be placed in the beam path immediately after the laser output and the spectra can be measured in both channels as a reference signal and measurement signal and plotted against the respective ND filter value.

Figure 12:
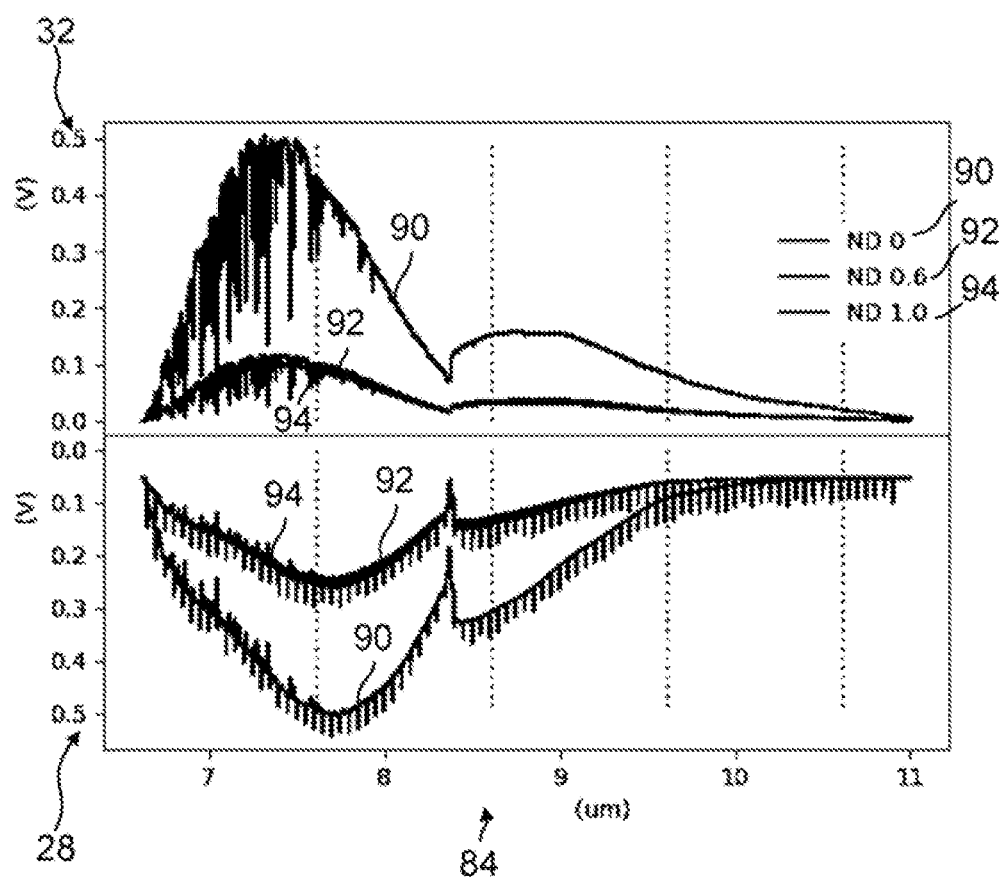
FIG. 12 shows spectra of measurement signals captured with different filter combinations for intensity calibration.
Figure 13:
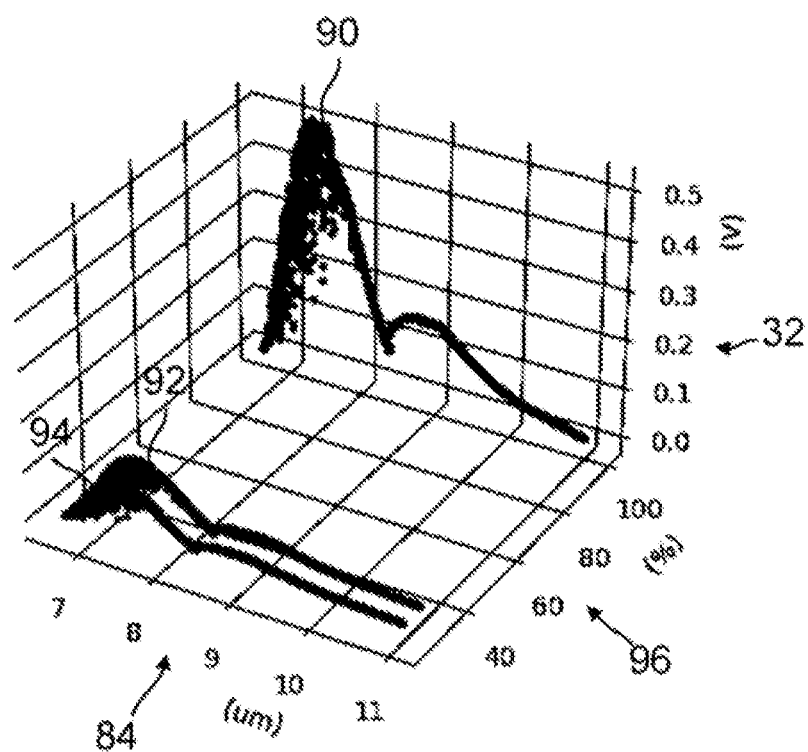
FIG. 13 shows a 3D representation of the spectra according to FIG. 12.

FIG. 12 shows spectra of measurement signals 90, 92, 94 captured with different filter combinations for intensity calibration, while FIG. 13 shows a 3D representation of the spectra 90, 92, 94.

Spectra of measurement signals 32 as a function of wavelength 84 are shown in the upper part of FIG. 12, while spectra of reference signals 28 are shown in the lower part.

In FIG. 13, a filter transmission value 96 is entered as the third dimension. The different filters have different filter transmission values 96, the spectrum 90 is captured with a transmission of 100%, the spectrum 92 with a transmission of approx. 40% and the spectrum 94 with a transmission of approx. 20%.

By means of appropriate interpolation, the relationship to the electrical reference voltage to be expected can be determined for a measured signal voltage for any wavelength in relation to the calibration measurement carried out once. In particular, this compensates for non-linear detector behavior.

Figure 14:
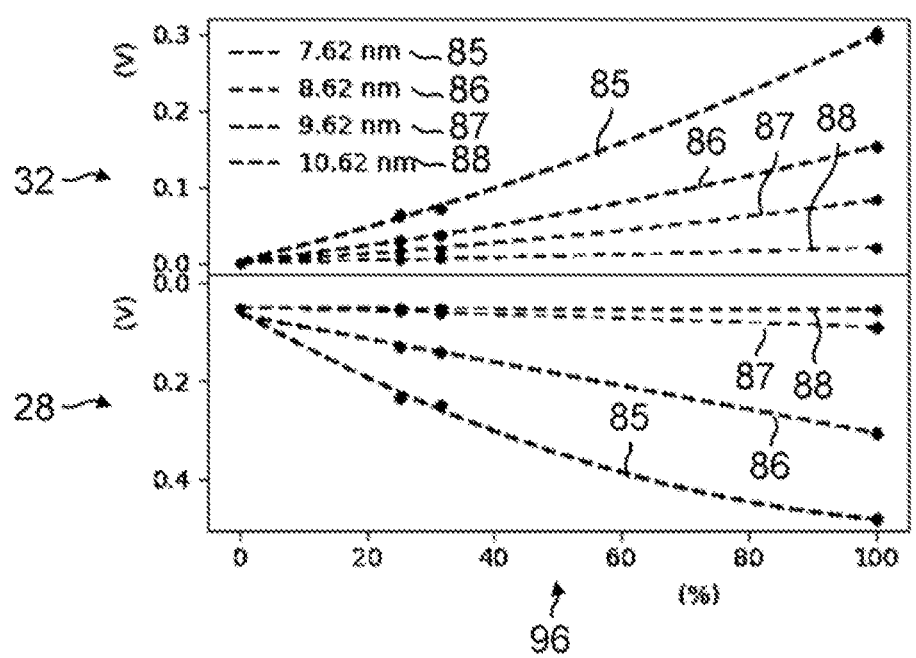
FIG. 14 shows calibration curves for different wavelengths according to FIG. 12.

FIG. 14 shows calibration curves 85, 86, 87, 88 for different wavelengths between 7.62 nm and 10.62 nm. In this case, values for measurement signals 32 and reference signals 28 are plotted as a function of transmission 96, so that a relationship between measurement signal value 32 and reference signal value 28 can be established.

The normalized absorption spectrum 70 can be determined on this basis by means of a corresponding evaluation algorithm.

Figure 15:
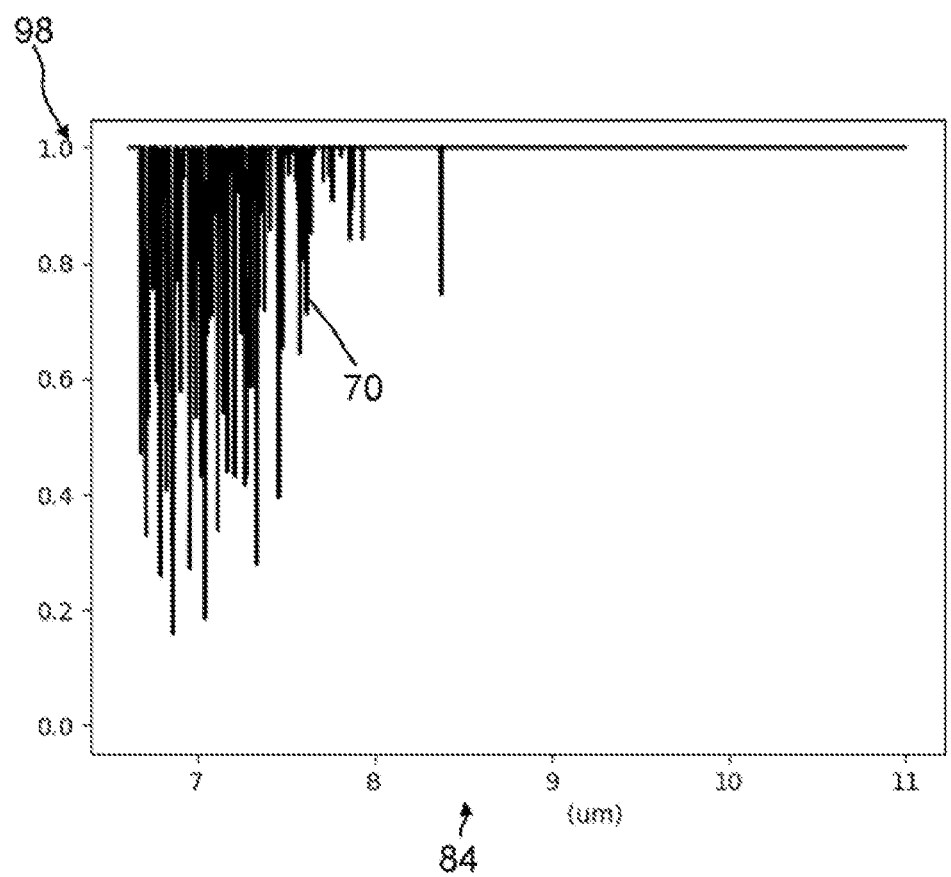
FIG. 15 shows a normalized absorption spectrum of the spectrum according to FIG. 11.

FIG. 15 shows a normalized absorption spectrum 70, determined from the spectrum 64 of a wavelength scan of a measurement signal 32 according to FIG. 11. Absorption values 98 are plotted as a function of the wavelength 84. Since no sample 30 is introduced into the beam path 16, only absorption lines of the atmosphere can be seen.

FIG. 16 shows a flow chart of a method for capturing infrared absorption spectra with an optical device according to an exemplary embodiment of the invention.

In a first step S100, laser light 16 from a laser 10 is emitted onto a sample 30 as a wavelength scan over a defined wavelength range.

In a second step S102, reference signals 28 of a reference detector 24 and trigger signals 12, 14 of the laser 10 are detected in a trigger unit 40, wherein the first trigger signal 12 outputs a temporal start and a temporal end of a wavelength scan and the second trigger signal 14 has a pattern of scanning pulses 38 distributed over the defined, tunable wavelength range in predetermined, in particular equal, wavelength intervals.

In step S104, the trigger signals 12, 14 are added in the trigger unit 40 and mixed with the reference signals 28, and then output as trigger output signals 58.

In a further step S106, measurement signals 32 of a measurement detector 26 of the laser light 20 scattered by the sample 30 are detected together with trigger output signals 58 in a data acquisition unit 60.

Steps S100 to S106 advantageously run practically in parallel, so that almost continuous reference signals, measurement signals, trigger signals are recorded.

The signal can be acquired unidirectionally by the data acquisition unit without a feedback loop. A continuous measurement is carried out, namely the trigger signals for scan and wavelength triggers are output continuously and are only stopped when the measurement is ended.

In step S108 the time-dependent measurement signals 32 of the individual wavelength scans of the laser light 16 are cut out using a first trigger signal 12.

In the case of the trigger output signal 58, the trigger output signal 58 is demodulated to reconstruct the first trigger signal 12 and the second trigger signal 14 as well as the reference signal 28.

In the next step S110, the time-dependent trigger output signals 58 are converted into a wavelength-dependent reference spectrum 62 using a second trigger signal 14.

In a further step S112, the time-dependent measurement signals 32 are converted into a wavelength-dependent measurement spectrum 64 by means of the second trigger signal 14.

In step S114, the wavelength-dependent measurement spectrum 64 is normalized using the reference spectrum 62 to form a normalized measurement spectrum 66.

In step S116, the absorption spectrum 70 is determined from the normalized measurement spectrum 66 using calibration data 85, 86, 87, 88 of the reference detector 24 and of the signal detector 26. The calibration data 85, 86, 87, 88 can be determined from measurements of reference signals 28 and measurement signals 32 with different filters at the output of the laser 16.

The time-dependent measurement signals 32 and the time-dependent trigger output signals 58 are recorded synchronously. In this way, a time-synchronous wavelength calibration and/or intensity calibration of the time-dependent measurement signals 32 can be carried out.

LIST OF REFERENCE NUMERALS 10 laser
12 first trigger signal
11 third trigger signal
14 second trigger signal
16 laser light
18 reference beam path
20 scattered laser light
22 semi-transparent mirror
23 mirror
24 reference detector
26 signal detector
28 reference signal
30 sample
32 measurement signal
34 scanning signal
36 scanning signal
38 scanning signal
40 trigger unit
42 input
43 input
44 input
46 input
48 output
50 level adaptation component
51 level adaptation component
52 level adaptation component
54 adder
56 mixer
58 trigger output signal
60 data acquisition unit
62 reference spectrum
64 measurement spectrum
66 normalized measurement spectrum
70 absorption spectrum
72 cutting out
74 measurement signal scan
76 conversion to wavelength
78 normalizing
80 time
82 voltage
84 calibration data
85 calibration data
86 calibration data
87 calibration data
88 calibration data
90 spectrum with filter
92 spectrum with filter
94 spectrum with filter
96 filter transmission
98 absorption
100 optical device

The invention claimed is:

1. An optical device for capturing infrared absorption spectra of a sample, comprising at least
    a tunable laser which is designed for repeatedly irradiating the sample with laser light as wavelength scans over a defined wavelength range,
    a reference detector in a reference beam path, in which part of the emitted laser light is received and converted into a reference signal,
    a signal detector, which receives laser light scattered on the sample and converts it into a measurement signal,
    a trigger-signal processing unit with at least one input for at least one first trigger signal and at least one input for at least one second trigger signal, at least one input for the reference signal and at least one output for a combined trigger output signal, and
    a data collection unit which acquires the combined trigger output signal of the trigger-signal processing unit and the measurement signal of the signal detector,
    wherein the laser outputs the at least one first trigger signal and second trigger signal, wherein the first trigger signal outputs a temporal start and a temporal end of a wavelength scan, and the second trigger signal comprises a pattern of scanning pulses distributed over the tunable wavelength range at predefined wavelength intervals,
    wherein the trigger-signal processing unit also has an adder, which adds the trigger signals, and a mixer, which mixes the at least first and second trigger signal with the reference signal to form the combined trigger output signal.

2. The optical device according to claim 1, wherein the trigger-signal processing unit has level adaptation components, which are designed to adapt a digital signal level of the first and second trigger signal to an analog signal level of the reference signal.

3. The optical device according to claim 1, wherein the mixer is designed as a bias-T mixer.

4. The optical device according to claim 1, wherein the adder is in the form of an analog adder.

5. The optical device according to claim 1, wherein the laser is designed to output a third trigger signal which indicates a direction of the wavelength change when tuning the laser, wherein the trigger-signal processing unit has a further input for detecting the third trigger signal, with which the trigger-signal processing unit detects the direction of change in wavelength of the wavelength scan of the laser light.

6. The optical device according to claim 1, wherein the laser is designed as a quantum cascade laser.

7. The optical device according to claim 1, wherein the data collection unit is designed to acquire the trigger output signal and the measurement signal synchronously in time.

8. The optical device according to claim 1, wherein a time-synchronous wavelength calibration and/or time-synchronous intensity calibration of the wavelength ranges of the time-dependent measurement signals is provided.

9. The trigger-signal processing unit for processing at least the first trigger signal, the second trigger signal and the reference signal of the tunable laser of the optical device for capturing infrared absorption spectra according to claim 1, having at least one input for the first trigger signal, at least one input for the second trigger signal and one input for the reference signal, and at least one output for a combined trigger output signal, having an adder, which adds the trigger signals and with a mixer which mixes the trigger signals with the reference signal to form the combined trigger output signal.

10. The trigger-signal processing unit according to claim 9, having level adaptation components which are designed to adapt a digital signal level of the trigger signals to an analog signal level of the reference signal.

11. The trigger-signal processing unit according to claim 9, wherein the mixer is designed as a bias-T mixer.

12. The trigger-signal processing unit according to claim 9, having a further input for detecting a third trigger signal in order to detect the direction of a wavelength change of a wavelength scan of the laser light.

13. The trigger-signal processing unit according to claim 12, wherein bi-directional wavelength scans of the laser light are processed.

14. The trigger-signal processing unit according to claim 9, wherein the adder is designed as an analog adder.

15. A method for capturing infrared absorption spectra with an optical device, comprising at least the steps
  (i) emitting laser light from a laser as a wavelength scan over a defined wavelength range onto a sample;
  (ii) detecting reference signals of a reference detector and of first and second trigger signals of the laser in a trigger-signal processing unit, wherein the first trigger signal outputs a temporal start and a temporal end of a wavelength scan, and the second trigger signal comprises a pattern of scanning pulses distributed over the tunable wavelength range at predefined wavelength intervals;
  (iii) adding the trigger signals in the trigger-signal processing unit and mixing them with the reference signals, then outputting them as trigger output signals;
  (iv) detecting measurement signals from a measurement detector of the laser light scattered by the sample and the trigger output signals in a data collection unit;
  (v) cutting out the time-dependent measurement signals of the individual wavelength scans of the laser light using a first trigger signal;
  (vi) converting the time-dependent trigger output signal into a wavelength-dependent reference spectrum using a second trigger signal;
  (vii) converting the time-dependent measurement signals into a wavelength-dependent measurement spectrum using the second trigger signal;
  (viii) normalizing the frequency-dependent measurement spectrum to form a normalized measurement spectrum using the reference spectrum;
  (ix) determining an absorption spectrum.

16. The method according to claim 15, wherein the trigger output signal is demodulated to reconstruct the first trigger signal and the second trigger signal and the reference signal.

17. The method according to claim 15, wherein the absorption spectrum is determined from the normalized measurement spectrum using calibration data of the reference detector and the signal detector.

18. The method according to claim 15, wherein the calibration data are determined from measurements of reference signals and measurement signals with different filters at the output of the laser.

19. The method according to claim 15, wherein the time-dependent measurement signals and the time-dependent trigger output signals are recorded synchronously.

20. The method according to claim 15, wherein a time-synchronous wavelength calibration and/or intensity calibration of the time-dependent measurement signals is carried out.

* * * * *